United States Patent
Lee et al.

(10) Patent No.: US 9,693,471 B2
(45) Date of Patent: Jun. 27, 2017

(54) DISPLAY DEVICE

(71) Applicant: Samsung Display Co., Ltd., Yongin, Gyeonggi-Do (KR)

(72) Inventors: Keunho Lee, Asan-si (KR); Sanga An, Daejeon (KR)

(73) Assignee: Samsung Display Co., Ltd., Sansung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/715,056

(22) Filed: May 18, 2015

(65) Prior Publication Data

US 2016/0109648 A1    Apr. 21, 2016

(30) Foreign Application Priority Data

Oct. 20, 2014  (KR) ................. 10-2014-0141926

(51) Int. Cl.
*F21V 8/00* (2006.01)
*H05K 5/00* (2006.01)
*G02F 1/1333* (2006.01)

(52) U.S. Cl.
CPC ..... *H05K 5/0017* (2013.01); *G02F 1/133308* (2013.01); *G02F 2001/133317* (2013.01); *G02F 2202/28* (2013.01)

(58) Field of Classification Search
CPC ..... G02B 6/0088; G02B 6/005; H05K 5/0017
See application file for complete search history.

(56) References Cited

U.S. PATENT DOCUMENTS

| | | | |
|---|---|---|---|
| 6,854,856 B2* | 2/2005 | Shin | G02B 6/0031 349/58 |
| 8,154,679 B2 | 4/2012 | Kim | |
| 8,253,875 B2 | 8/2012 | Kim | |
| 8,783,930 B2 | 7/2014 | Park et al. | |
| 2003/0123017 A1 | 7/2003 | Kim et al. | |
| 2007/0002206 A1* | 1/2007 | Shirai | G02F 1/133308 349/58 |
| 2009/0310057 A1* | 12/2009 | Kang | G02F 1/133615 349/58 |
| 2010/0066938 A1* | 3/2010 | Lee | G02B 6/0088 349/58 |
| 2010/0141865 A1* | 6/2010 | Jung | G02F 1/133615 349/61 |
| 2010/0309404 A1* | 12/2010 | Lim | G02F 1/133308 349/58 |
| 2011/0187634 A1* | 8/2011 | Kim | G09G 3/36 345/102 |

(Continued)

FOREIGN PATENT DOCUMENTS

| | | |
|---|---|---|
| KR | 2003-0057682 A | 7/2003 |
| KR | 10-0771568 B1 | 10/2007 |

(Continued)

*Primary Examiner* — Elmito Breval
(74) *Attorney, Agent, or Firm* — Robert E. Bushnell, Esq.

(57) ABSTRACT

A display device comprises: a mold frame including a support having a quadrilateral loop shape; a display panel having edge portions of a rear surface of the display panel, the edge portions being supported by the support; and a plurality of adhesive tapes disposed between the support and the display panel. The support is disposed between the plurality of adhesive tapes and has at least one protrusion protruding toward the display panel.

18 Claims, 6 Drawing Sheets

(56) References Cited

U.S. PATENT DOCUMENTS

| | | | |
|---|---|---|---|
| 2011/0187956 A1* | 8/2011 | Kim | G02F 1/1333 |
| | | | 349/58 |
| 2011/0216489 A1* | 9/2011 | Lim | H05K 7/00 |
| | | | 361/679.01 |
| 2011/0310324 A1* | 12/2011 | Jang | G02F 1/1335 |
| | | | 349/58 |
| 2012/0001868 A1* | 1/2012 | Na | G06F 3/041 |
| | | | 345/174 |
| 2012/0162565 A1* | 6/2012 | Lee | G02F 1/133308 |
| | | | 349/58 |
| 2012/0162880 A1* | 6/2012 | Yoon | H04N 5/64 |
| | | | 361/679.01 |
| 2012/0169958 A1* | 7/2012 | Lee | G02F 1/133308 |
| | | | 349/58 |
| 2012/0182492 A1* | 7/2012 | Ro | B29C 45/1418 |
| | | | 349/58 |
| 2012/0182493 A1* | 7/2012 | Hwang | G02F 1/133308 |
| | | | 349/58 |
| 2012/0250290 A1 | 10/2012 | Park et al. | |
| 2012/0257414 A1 | 10/2012 | Park et al. | |
| 2012/0287672 A1* | 11/2012 | Lee | G02F 1/133608 |
| | | | 362/609 |
| 2013/0039036 A1 | 2/2013 | Son et al. | |
| 2014/0313770 A1 | 10/2014 | Park et al. | |
| 2014/0362325 A1 | 12/2014 | Lee et al. | |

FOREIGN PATENT DOCUMENTS

| | | |
|---|---|---|
| KR | 10-2008-0068164 A | 7/2008 |
| KR | 10-2013-0017477 A | 2/2013 |
| KR | 10-2013-0025765 A | 3/2013 |
| KR | 10-2013-0077236 A | 7/2013 |

* cited by examiner

DISPLAY DEVICE

CLAIM OF PRIORITY

This application claims priority to and claims all benefits accruing under 35 U.S.C. §119 from an application earlier filed in the Korean Patent Application No. 10-2014-0141926 filed on Oct. 20, 2014 with the Korean Intellectual Property Office, the disclosure of which is incorporated herein in its entirety by reference.

BACKGROUND OF THE INVENTION

Field of the Invention

The present invention relates to a display device improved in reducing light leakage occurring between a display panel and a mold frame.

Description of the Related Art

Display devices are categorized into a liquid crystal display (LCD), an organic light emitting display (OLED), a plasma display panel (PDP), and an electrophoretic display (EPD) and the like according to methods of light emission.

The display device may include a display panel and a mold frame configured to support and fix the display panel. In order to reduce the thickness of the display device, slim type display devices have been recently suggested, wherein the display panel is directly attached to the mold frame using a double-sided tape and the like.

The double-sided tape having a quadrilateral loop shape may be used to attach an edge portion of a rear surface of the display panel to the mold frame. In general, the double-sided tape having a quadrilateral loop shape is formed by removing a center portion of a double-sided tape having a quadrilateral shape, which may waste material and increase manufacturing cost.

On the other hand, a method of attaching the display panel to the mold frame using a split-type double-sided tape having a quadrilateral loop shape is suggested, but light leakage may occur at a gap between each split double-sided tape.

It is to be understood that this background section is intended to provide useful background for understanding the technology and, as such is disclosed herein, the background section may include ideas, concepts or recognitions that were not part of what was known or appreciated by those skilled in the pertinent art prior to a corresponding effective filing date of subject matter disclosed herein.

SUMMARY OF THE INVENTION

The present invention is directed to a display device capable of preventing light leakage occurring at a gap between each split double-sided tape when attaching a display panel to a mold frame using the split-type double-sided tape.

According to the present invention, a backlight unit includes: a mold frame including a support having a quadrilateral loop shape; a display panel, edge portions of a rear surface of the display panel being supported by the support; and a plurality of adhesive tapes between the support and the display panel; wherein the support is disposed between the plurality of adhesive tapes and has at least one protrusion protruding toward the display panel.

The protrusion may have a thickness the same as or less than a thickness of the adhesive tape.

The protrusion may be disposed at a corner portion of the support.

The protrusion may include a first protrusion between the adhesive tapes and a second protrusion extending from the first protrusion along the adhesive tape.

The protrusion may be formed of a material the same as a material forming the mold frame.

The adhesive tape may be a double-sided tape.

According to embodiments of the present invention, a display device forms a protrusion between each double-sided tape, thereby preventing light leakage from occurring at a gap between each double-sided tape.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
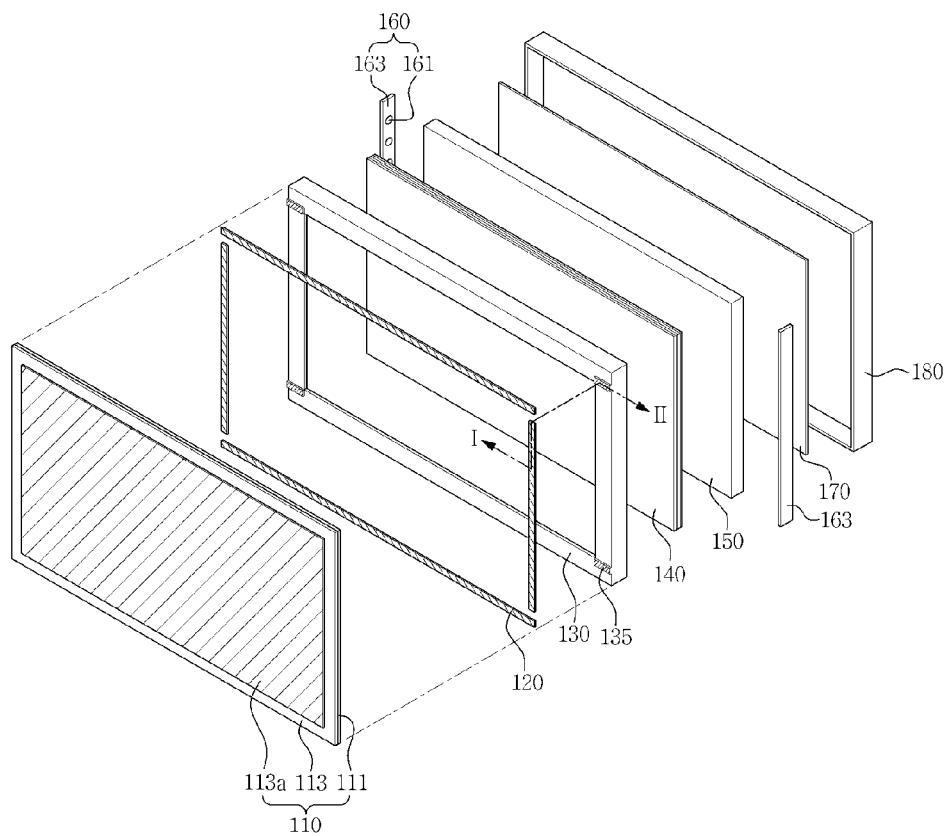
FIG. 1 is an exploded perspective view illustrating a display device according to an exemplary embodiment of the invention.

Hereinafter, embodiments of the present invention will be described in more detail with reference to the accompanying drawings.

Although the present invention can be modified in various manners and have several embodiments, specific embodiments are illustrated in the accompanying drawings and will be mainly described in the specification. However, the scope of the embodiments of the present invention is not limited to the specific embodiments and should be construed as including all changes, equivalents, and substitutions included in the spirit and scope of the present invention.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Some of the parts which are not associated with the description may not be provided in order to specifically describe embodiments of the present invention, and like reference numerals refer to like elements throughout the specification.

Hereinafter, it is assumed that an LCD display is used as a display device according to an exemplary embodiment. However, it is obvious that the present invention can be applied to an OLED or a PDP other than the LCD.

Furthermore, it is assumed that an LCD display panel is used as a display panel according to an exemplary embodiment, but the invention is not limited thereto. In some embodiments, the display panel may be an OLED.

Furthermore, the display device is described as including an edge type backlight unit, but is not limited thereto. In some embodiments, the backlight unit may be a direct type or a corner type.

Figure 2:
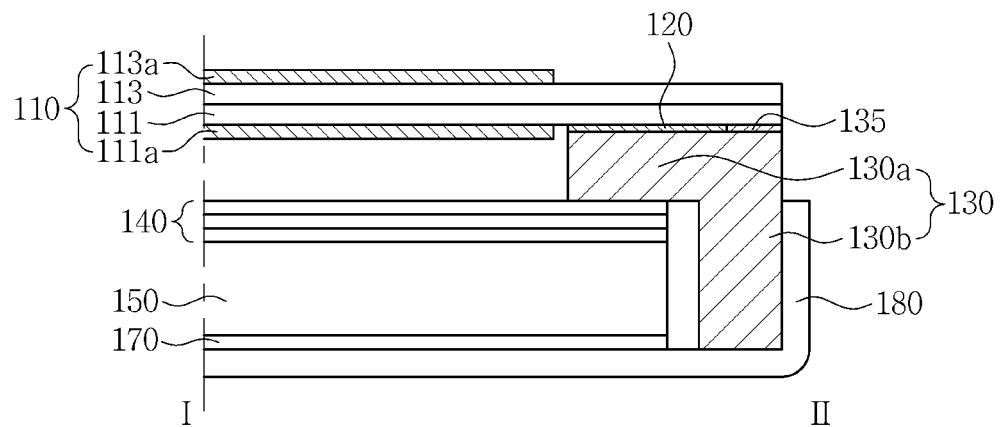
FIG. 2 is a cross-sectional view taken along line I-II of FIG. 1.

FIG. 1 is an exploded perspective view illustrating a display device according to an exemplary embodiment of the invention, and FIG. 2 is a cross-sectional view taken along line I-II of FIG. 1.

Referring to FIGS. 1 and 2, the display device according to an exemplary embodiment includes a display panel 110, a plurality of adhesive tapes 120, a mold frame 130, an optical sheet 140, a light guide plate 150, a light source unit 160, a reflective sheet 170, and a bottom chassis 180.

Hereinafter, a backlight unit is to be understood as having a concept including the optical sheet 130, the middle frame 140, the light guide plate 150, the light source unit 160, the reflective sheet 170, and the lower frame 180.

Furthermore, although not illustrated in FIGS. 1 and 2, the display device according to an exemplary embodiment may further include a top chassis configured to fix an upper edge portion of the display panel 110 to the backlight unit. In this case, the top chassis may be coupled to the mold frame 130 and the bottom chassis 180 by hooks and/or screws.

The display panel 110 is configured to display an image using light and may have a quadrangular panel form. The display panel 110 may include a first substrate 111, a second substrate 113 opposed to the first substrate 111, and a liquid crystal layer (not illustrated) disposed between the first and second substrates 111 and 113, respectively.

The first substrate 111 includes a plurality of pixel electrodes arranged in a matrix form, a thin film transistor (TFT) configured to apply a driving voltage to each pixel electrode, and a plurality of signal lines configured to drive the pixel electrode and the TFT.

The second substrate 113 is disposed to face the first substrate 111 and includes a common electrode and a color filter that include transparent conductive materials. The color filter includes red, green, and blue color filters.

The liquid crystal layer (not illustrated) is interposed between the first and second substrates 111 and 113, respectively, and liquid crystal molecules of the liquid crystal layer are rearranged in accordance with an electric field formed between the pixel electrode and the common electrode. Accordingly, the rearranged liquid crystal layer adjusts transmittance of light emitted from the backlight unit and the adjusted light passes through the color filter to display an image outward.

Furthermore, a lower polarizer 111a and an upper polarizer 113a may be further disposed on a rear surface of the first substrate 111 and on an upper surface of the second substrate 113, respectively. The upper polarizer 113a and the lower polarizer 111a may have a size corresponding to the display panel 110. The upper polarizer 113a may only allow light having a predetermined polarization direction among light incident from the outside to pass through, and absorb or block other light. The lower polarizer 111a may only allow light having a predetermined polarization direction among light emitted from the backlight unit to pass through, and absorb or block other light.

Although not illustrated in FIGS. 1 and 2, a driving circuit substrate (not illustrated) may be further disposed on at least one surface of the display panel 110. The driving circuit substrate may provide various control signals and power signals for driving the display panel 110. Furthermore, the display panel 110 and a driving circuit substrate (not illustrated) may be electrically connected by at least one flexible printed circuit board (FPCB, not illustrated). The FPCB may be a chip on film (COF) or a tape carrier package (TCP), and the number of the FPCBs may vary according to the size and the driving method of the display panel 110.

A plurality of adhesive tapes 120 may be disposed between an edge portion of a rear surface of the display panel 110 and the mold frame 130. The adhesive tape 120 may be a double-sided tape and generally used adhesive tapes can be employed without limitation.

The mold frame 130 may have a quadrilateral-loop shape and may include a support 130a supporting an edge portion of the rear surface of the display panel 110 and a side wall portion 130b including the optical sheet 140, the light guide plate 150, the light source unit 160, the reflective sheet 170, and the like.

The plurality of adhesive tapes 120 may be disposed on the support 130a of the mold frame 130 so as to attach the display panel 110 to the mold frame 130. Furthermore, the mold frame 130 may be disposed between the adhesive tapes 120 and may include at least one protrusion 135 protruding toward the display panel 110.

The mold frame 130 may be formed as a single unit, but a plurality of units may be assembled to form the mold frame 130, where necessary. The mold frame 130 may include flexible materials such as plastics and may be formed by an injection molding process and the like. The protrusion 135 may include the same material as the mold frame 130, and may be integrally formed with the mold frame 130 and the like by an injection molding process. The configuration of the mold frame 130 and the protrusion 135 is described below in more detail.

The optical sheet 140 is disposed on the light guide plate 150 and is configured to diffuse and/or collect light directed from the light guide plate 150. The optical sheet 140 may include a diffusion sheet, a prism sheet, and/or a protective sheet. The diffusion sheet, the prism sheet, and the protective sheet may be sequentially laminated on the light guide plate 150 in the order listed.

The prism sheet may collect light guided by the diffusion sheet, the diffusion sheet may diffuse light collected by the prism sheet, and the protective sheet may protect the prism sheet. Light leaving the protective sheet may be directed toward the display panel 110.

The light guide plate 150 may uniformly direct light provided from the light source unit 160 to the display panel 110. The light guide plate 150 may include a quadrilateral plate, but is not limited thereto. When a light emitting diode (LED) chip is used as a light source, the light guide plate 150 may have various forms including predetermined grooves, protrusions, or the like depending on the position of the light source.

Although referred to as a plate for ease of description, the light guide plate 150 may be in the shape of a sheet or a film, thereby achieving a slim display device. In other words, the light guide plate 150 is to be understood as having a concept including a plate and a film for guiding light.

The light guide plate 150 may include a light-transmissive material such as, for example, acrylic resins, such as polymethylmethacrylate (PMMA), or polycarbonate (PC) so as to guide light efficiently.

The light source unit 160 includes a light source 161 and a circuit substrate 163 on which the light source 161 is disposed.

The light source 161 may be disposed at a corner portion or on a light incident side portion of the light guide plate 150. In other words, the light source 161 may emit light toward the corner portion or the light incident side portion of the light guide plate 150. The light source 161 may include at least one LED chip (not illustrated) and a package (not illustrated) for accommodating the LED chip. For example, the LED chip (not illustrated) may be a gallium nitride (GaN)-based LED chip that emits blue light.

The number of the light sources 161 may vary in consideration of size and luminance uniformity of the display panel 110. The circuit substrate 163 may include a printed circuit board (PCB) or a metal PCB.

Although not illustrated in FIGS. 1 and 2, a wavelength converting unit (not illustrated) may be disposed between the light guide plate 150 and the light source unit 160. The wavelength converting unit (not illustrated) may include a substance that can change a wavelength of light. For example, the wavelength converting unit may change a wavelength of blue light emitted from a blue LED light source so that the blue light may be converted to white light.

Furthermore, a heat dissipating member (not illustrated) may be disposed between the light source unit 160 and the bottom chassis 180. The heat dissipating member may release heat generated from the light source unit 160 to the outside. When the light source unit 160 is disposed on one side portion of the bottom chassis 180 in a bar or line shape, a metal frame having a bar or line shape may be disposed as the heat dissipating member. Accordingly, the heat dissipating member may have various shapes according to the shape of the light source unit 160.

The reflective sheet 170 is disposed between the light guide plate 150 and the bottom chassis 180. The reflective sheet 170 is configured to reflect light emitted downward from the light guide plate 150 so as to be directed toward the display panel 110, thereby improving light efficiency.

The reflective sheet 170 may include, for example, polyethylene terephthalate (PET), and may reflect light. A surface of the reflective sheet 170 may be coated with a diffusion layer including, for example, titanium dioxide. The reflective sheet 170 may include materials containing metal, such as silver (Ag).

The bottom chassis 180 is responsible for maintaining a framework of the display device and protecting a variety of elements accommodated therein. The bottom chassis 180 may be formed of a rigid metal material, such as stainless steel, or a material having good heat dissipation properties, such as aluminum or an aluminum alloy. The bottom chassis 180 may be formed by a mold press process and the like so as to have a predetermined curvature.

Figure 3:
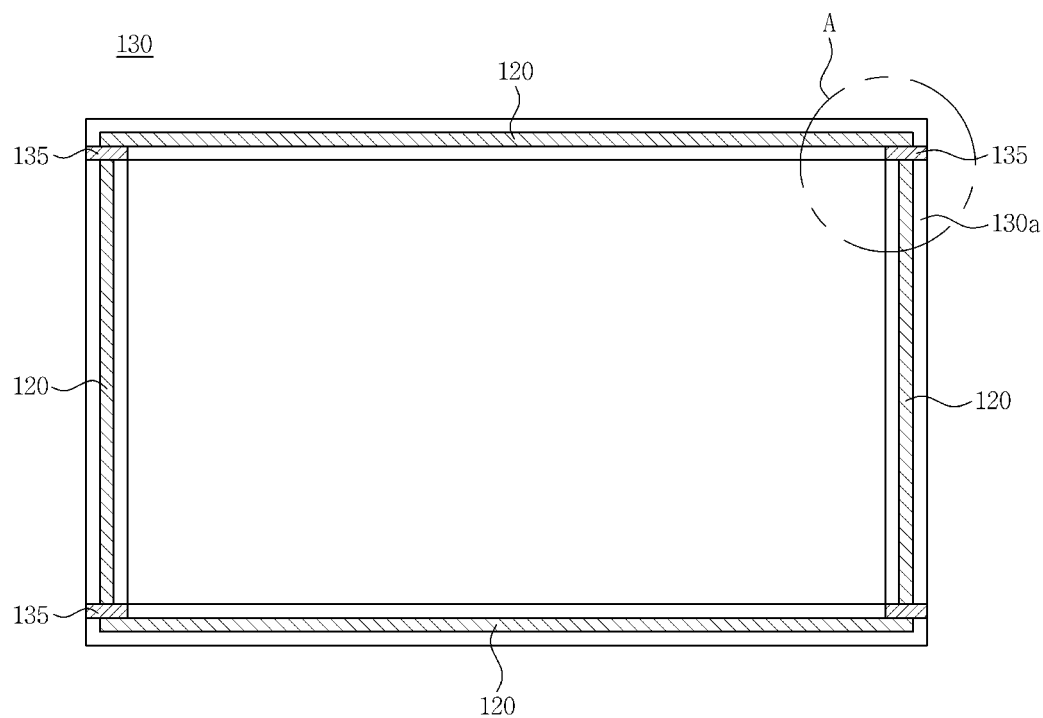
FIG. 3 is a plan view illustrating a mold frame and an adhesive tape according to an exemplary embodiment of the invention.
Figure 4:
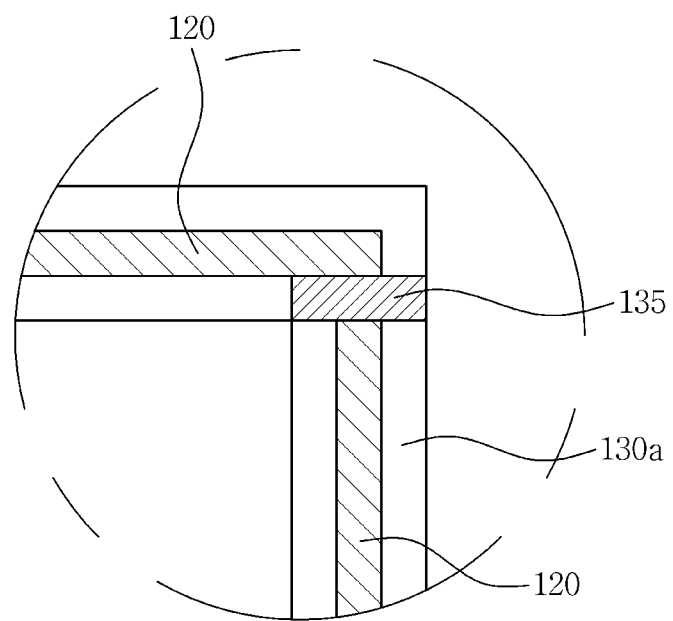
FIG. 4 is a partial exploded perspective view illustrating portion "A" of FIG. 3.

FIG. 3 is a plan view illustrating a mold frame and an adhesive tape according to an exemplary embodiment of the invention, and FIG. 4 is a partial exploded perspective view illustrating portion "A" of FIG. 3.

Referring to FIGS. 3 and 4, the mold frame 130 according to an exemplary embodiment may include a support 130a on which the adhesive tape 120 is disposed and a side wall portion (not illustrated) accommodating a variety of elements of the backlight unit.

The plurality of adhesive tapes 120 may be disposed on the support 130a of the mold frame 130 so as to attach a display panel to the mold frame 130. The mold frame 130 may be disposed on the plurality of adhesive tapes 120 and may include at least one protrusion 135 protruding toward the display panel.

The protrusions 135 may have a thickness the same as or less than the thickness of the adhesive tape 120. As the protrusion 135 fills a gap between the plurality of adhesive tapes 120, light leakage between the display panel and the mold frame 130 may be prevented. Furthermore, the protrusion 135 may function as an align mark in order to easily attach the adhesive tape 120.

The protrusion 135 may be formed in any area on the support 130a of the mold frame 130, but it is desirable that the protrusion 135 be formed on a corner portion of the support 130a so as to save materials of the adhesive tape 120.

The mold frame 130 is depicted as having protrusions 135 on four corner portions of the support 130a in FIG. 3, but embodiments of the present invention are not limited thereto. The mold frame 130 may have the protrusion 135 on at least one corner portion of the support 130a.

Figure 5:
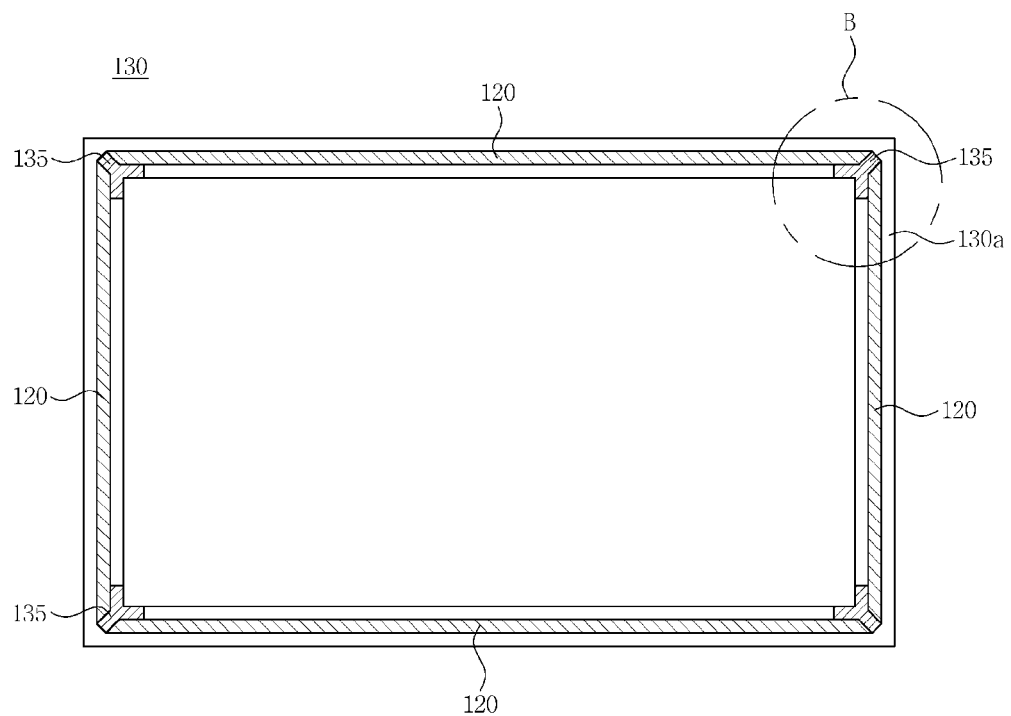
FIG. 5 is a plan view illustrating a mold frame and an adhesive tape according to another exemplary embodiment of the invention.
Figure 6:
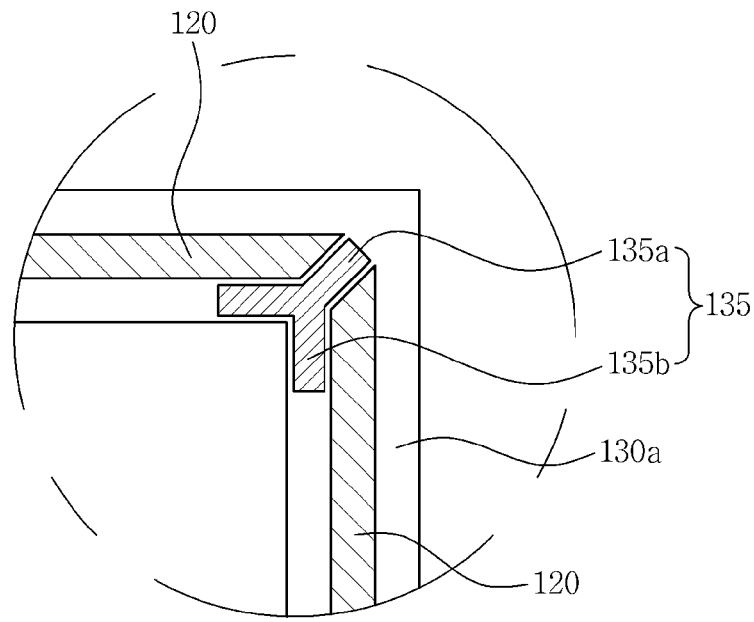
FIG. 6 is a partial exploded perspective view illustrating portion "B" of FIG. 5.

FIG. 5 is a plan view illustrating a mold frame and an adhesive tape according to another exemplary embodiment of the invention, and FIG. 6 is a partial exploded perspective view illustrating portion "B" of FIG. 5.

The repeated description of the mold frame according to an exemplary embodiment will be omitted.

Referring to FIGS. 5 and 6, the mold frame 130 according to another exemplary embodiment may include a support 130a on which the adhesive tape 120 is disposed and a protrusion 135 disposed on the support 130a.

The plurality of adhesive tapes 120 may be disposed on the support 130a of the mold frame 130 so as to attach a display panel to the mold frame 130. The mold frame 130 may be disposed on the plurality of adhesive tapes 120, and may include at least one protrusions 135 protruding toward the display panel. The mold frame 130 may have the protrusion 135 on at least one corner portion of the support 130a.

The protrusion 135 may include a first protrusion 135a disposed between the plurality of adhesive tapes 120 and a second protrusion 135b extending from the first protrusion 135a along the adhesive tape 120.

In FIG. 6, the second protrusion 135b is depicted as extending from the first protrusion 135a in parallel with the adhesive tape 120, but the second protrusion 135b may not be parallel to the adhesive tape 120.

Light leakage occurring between the display panel and the mold frame may be firstly prevented by the first protrusion 135a disposed between the adhesive tapes 120. Furthermore, light leakage occurring between the display panel and the mold frame may be secondly prevented by the second protrusion 135b extending from the first protrusion 135a.

Figure 7:
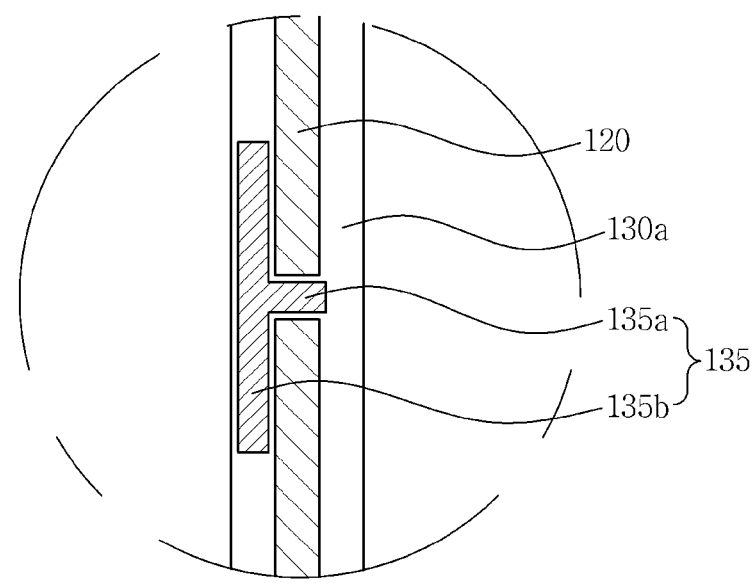
FIGS. 7 and 8 are plan views illustrating a mold frame and an adhesive tape according to another exemplary embodiment of the invention.
Figure 8:
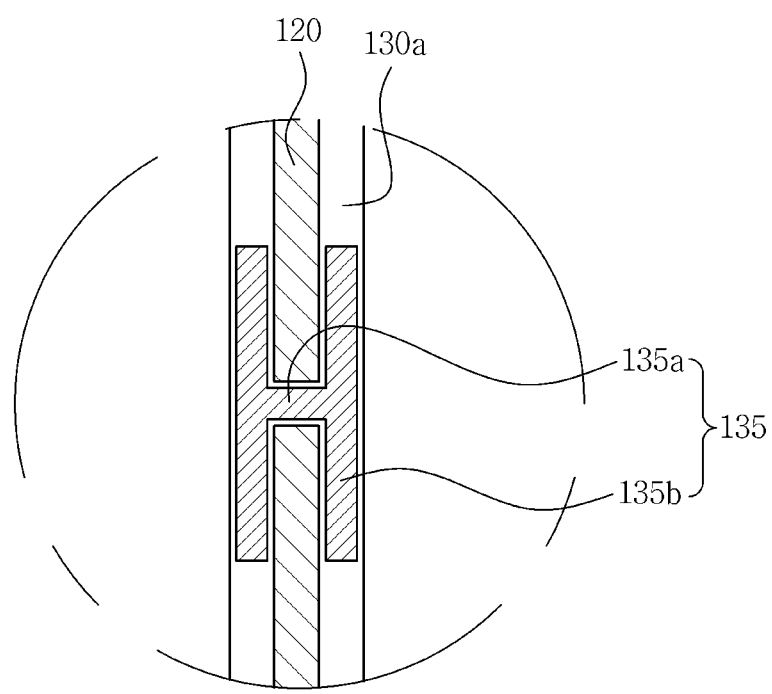

FIGS. 7 and 8 are plan views illustrating a mold frame and an adhesive tape according to another exemplary embodiment of the invention.

Referring to FIGS. 7 and 8, the mold frame 130 according to another exemplary embodiment may include a support 130a on which the adhesive tape 120 is disposed and a protrusion 135 disposed on the support 130a.

The plurality of adhesive tapes 120 may be disposed on the support 130a of the mold frame 130 so as to attach a display panel to the mold frame 130. The mold frame 130 may have the protrusion 135 on a side portion rather than on the corner portion of the support 130a.

The protrusion 135 may include a first protrusion 135a disposed between the plurality of adhesive tapes 120, and a second protrusion 135b extending from the first protrusion 135a along the adhesive tape 120.

The second protrusion 135b may be provided on one side with respect to the first protrusion 135a (refer to FIG. 7) or may be provided on both sides with respect to the first protrusion 135a (refer to FIG. 8).

Light leakage occurring between the display panel and the mold frame may be firstly prevented by the first protrusion 135a disposed between the adhesive tapes 120. Furthermore, light leakage occurring between the display panel and the mold frame may be secondly prevented by the second protrusion 135b extending from the first protrusion 135a.

From the foregoing, it will be appreciated that various embodiments in accordance with the present invention have been described herein for purposes of illustration, and that various modifications may be made without departing from the scope and spirit of the present invention. Accordingly, the various embodiments disclosed herein are not intended to be limiting as to the true scope and spirit of the present invention.

What is claimed is:

1. A display device, comprising:
a mold frame including a support having a quadrilateral loop shape;
a display panel having edge portions of a rear surface of the display panel, the edge portions being supported by the support; and
a plurality of adhesive tapes disposed between the support and the display panel;
wherein the support has at least one protrusion disposed between the plurality of adhesive tapes and protruding toward the display panel,
wherein the protrusion has a thickness not greater than a thickness of the adhesive tapes.

2. The display device of claim 1, wherein the protrusion has a thickness not greater than the thickness of the adhesive tapes.

3. The display device of claim 1, wherein the protrusion is disposed at a corner portion of the support.

4. The display device of claim 1, wherein the protrusion comprises a first protrusion disposed between the adhesive tapes, and a second protrusion extending from the first protrusion along the adhesive tapes.

5. The display device of claim 4, wherein two adhesive tapes are disposed at a right angle with respect to each other so as to form a corner portion, the first portion is disposed at the corner portion between the two adhesive tapes, and the second portion comprises two parts, each part extending along and in parallel with a respective one of the adhesive tapes.

6. The display device of claim 4, wherein two adhesive tapes are disposed adjacent to each other with a gap between end portions of the two adhesive tapes, the first portion is disposed in the gap, and the second portion is disposed in parallel with and extending along the two adhesive tapes.

7. The display device of claim 4, wherein two adhesive tapes are disposed adjacent to each other with a gap between end portions of the two adhesive tapes, the first portion is disposed in the gap, and the second portion comprises two parts, each part being disposed in parallel with and extending along a respective side of the two adhesive tapes.

8. The display device of claim 1, wherein the protrusion is formed from a material that is the same as a material forming the mold frame.

9. The display device of claim 1, wherein the adhesive tapes are double-sided tapes.

10. The display device of claim 1, further comprising an optical sheet disposed adjacent to the mold frame and remote from the adhesive tapes.

11. The display device of claim 10, further comprising a light guide plate disposed on a side of the optical sheet remote from the mold frame.

12. The display device of claim 11, further comprising a light source unit combined with the light guide plate.

13. The display device of claim 11, further comprising a reflective sheet disposed on a side of the light guide plate remote from the mold frame.

14. The display device of claim 10, further comprising a reflective sheet disposed on a side of the optical sheet remote from the mold frame.

15. The display device of claim 1, further comprising a light guide plate disposed adjacent to the mold frame and remote from the adhesive tapes.

16. The display device of claim 15, further comprising a light source unit combined with the light guide plate.

17. The display device of claim 15, further comprising a reflective sheet disposed on a side of the light guide plate remote from the mold frame.

18. A display device, comprising:
a mold frame including a plurality of supports having a quadrilateral loop shape;
a display panel having edge portions of a rear surface of the display panel, the edge portions being supported by the support; and
a plurality of adhesive tapes disposed between the supports, and disposed between the supports and the display panel;
wherein the supports are disposed between the plurality of adhesive tapes and has at least one protrusion protruding toward the display panel,
wherein the protrusion has a thickness not greater than a thickness of the adhesive tapes.

* * * * *